(12) United States Patent
Batinovich

(10) Patent No.: US 7,809,662 B2
(45) Date of Patent: Oct. 5, 2010

(54) COMPUTER-ASSISTED METHOD OF CREATING A VISUAL AID FOR SOLVING A COMPLEX PROBLEM

(76) Inventor: Kenneth M. Batinovich, 3200 La Rotonda Dr., Unit 301, Rancho Palos Verdes, CA (US) 90275

( * ) Notice: Subject to any disclaimer, the term of this patent is extended or adjusted under 35 U.S.C. 154(b) by 883 days.

(21) Appl. No.: 11/711,074

(22) Filed: Feb. 27, 2007

(65) Prior Publication Data

US 2007/0183627 A1    Aug. 9, 2007

Related U.S. Application Data

(63) Continuation-in-part of application No. 11/227,949, filed on Sep. 14, 2005, now Pat. No. 7,720,776.

(51) Int. Cl.
*G06F 17/00* (2006.01)
*G06N 5/00* (2006.01)

(52) U.S. Cl. .............................. 706/45; 706/46; 706/47
(58) Field of Classification Search ....................... None
See application file for complete search history.

(56) References Cited

OTHER PUBLICATIONS

Josang et al., A., "Conditional Deduction Under Uncertainty", 2005.*
Josang, Audun, "Trust-Based Decision Making for Electronic Transactions", 1999.*
Josang, Audun, "Artificial Reasoning with Subjective Logic", 1997.*
Josang, Audun, "Subjective Evidential Reasoning", 2002.*

* cited by examiner

*Primary Examiner*—Michael B. Holmes
*Assistant Examiner*—Adrian L Kennedy
(74) *Attorney, Agent, or Firm*—Gene W Arant

(57) ABSTRACT

A computer-assisted method for analyzing a complex problem and creating an alpha-triadic representation with five degrees of articulation illustrating the relationships among its various parameters.

1 Claim, 22 Drawing Sheets

CONVENTIONAL REPRESENTATION

ALPHA-TRIADIC REPRESENTATION

COMMODITY SUPPLY

CONVENTIONAL REPRESENTATION

TRIADIC REPRESENTATION

COMMODITY SUPPLY

Successive values of the known variables:

(p1, q1, s1)   (p2, q1, s2)   (p3, q1, s3)

Progression in the price variable:

p1 p2 p3      = [Fluctuation]

Progression in the quantity variable:

q1 q1 q1      = [Stock]

Progression in the supply variable:

s1 s2 s3      = [Disturbance]

If price would be p1 p3 p2, this would be = [Cycle]

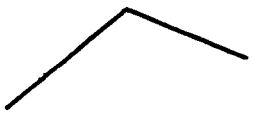

If quantity would be q1 q2 q3, this would be = [Flow]

If supply would be s1 s1 s1, this would be = [Equilibrium]

Mixed forms of behavior can be obtained by altering the combinations or taking them over a longer span.

FIG. 18

COMPUTER-ASSISTED METHOD OF CREATING A VISUAL AID FOR SOLVING A COMPLEX PROBLEM

PRIORITY CLAIM

This application is a Continuation-in-Part of my application Ser. No. 11/227,949 filed Sep. 14, 2005, now U.S. Pat No. 7,720,776, for which I claim priority under Title 35 USC Section 120.

FIELD OF THE INVENTION

The field of this invention is the analysis and solution of complex problems that may involve a plurality of practical or theoretical disciplines.

BACKGROUND OF THE INVENTION

Some solutions to problems are entirely mathematical while other problems are non-mathematical in nature and still others become mathematical after the true nature and scope of problem have been identified. The present invention relates to solving complex problems that arise in many different domains or fields of activity, and in some of which it is difficult to identify the parameters or factors that would be of interest in analyzing and solving the problem.

In the full contextual view, however, entire spheres of knowledge come into play. For example, what is true in the engineering context may not be 'true' in the manufacturing context. What is acceptable in an economic context may not be so in an ethical context. Yet the need for reliable context is a major imperative of our time, when information technology has empowered even the lowest-level worker with potential policy-level impact. At the same time, it is precisely information technology that makes large-scale contextual exploration feasible, linking diverse realms, both analytically and graphically.

Since the time of Descartes, scientific analysis has often been based on a system of independent, rectangular coordinates. The principal feature of this approach has been the projection of concrete 'geometrical' problems onto a set of independent 'arithmetical' dimensions. The benefit that accrues from that decomposition of spatial problems into numerical problems (and vice versa) is the ease with which the quantitative essentials of a phenomenon can be manipulated. Nevertheless, rectangular coordinates have no inherent geometry of their own. Each dimension is orthogonal to the others, which can be 'N' in number. No real articulation inheres in such an approach, other than the number of dimensions themselves. Any domain of significance must be defined after the fact. In conceptual studies, Cartesian coordinates are used only to create a uniform matrix of causal factors, all independent.

The contextual world, however, is not in general linearly independent. To adequately represent this realm requires a coordinate system with an inherent dimensionality of it own, so that cognitive units can be isolated and juxtaposed in illuminating fashion. In recent years, a number of partial approximations in this direction have come to light as;

a) A typology of form versus function as it applies to fish and their habit of swimming employed a triangular construct to organize the differences in fish shape and type of locomotion. Paul W. Webb, 'Form and Function in Fish Swimming," Scientific American b) The inventor of the geodesic dome touted in print the virtues of triangular coordination, which he used in his architectural designs and claimed had merit in analytical pursuits. W. Buckminster Fuller, Collected Works c) An English polymath has his own largely unpublished usages of a triangular analytic structure, including their application to the question of context. David Taylor (Malvern, England), personal correspondence d) Authors in the field of 'system theory' have progressively expounded certain isolated principles necessary for a workable construct. Boulding, Churchman, Ackoff Neither separately nor together, however, do these offerings approach the full power and scope of my method.

SUMMARY OF THE INVENTION

The present invention is a method of identifying, analyzing, and solving a complex problem arising in a domain that involves a large number of practical or theoretical parameters. The method comprises the steps of:

a) Creating a triangular flame of visual reference;

b) Selecting a first set of three of the parameters and adding representations of them into that triangular frame of visual reference;

c) Selecting a second and different set of three of the parameters and adding representations of that second set of parameters into that same triangular frame of visual reference; and d) Continuing the process in an iterative fashion with further and succeeding sets of three parameters, constituting further degrees of articulation. All this is accomplished in a single process of visualization by placing these parameters on a triangular reference.

One of the objects of this process and any apparatus designed to support it is to provide a synoptic view of one or a plurality of related domains such that one or a plurality of dimensions undisclosed in the conventional approach will be conveniently disclosed and represented by this method.

This new representation employs one or more triadic sets of parameters constructed upon a single triangle, each of which fits within the framework of the previous ones.

In practice, this method allows the treatment of such diverse domains as administrative, engineering, manufacturing and compensation to be identified, analyzed and depicted.

By conveniently employing a visual aid in the form of an equilateral triangle, the user can decompose domains into corners, edges, two-level infrastructure, and sets of midpoints of the sides.

Hence, this visual aid may include five-degrees of articulation and include the Cartesian approach as a special case. As such, it is a new engine for organizing and expanding diverse bodies of knowledge, information and data.

I call it 'alpha-triadic' because it is both qualitative and quantitative. It has advantages that will become apparent from a study of the following description and the accompanying drawings.

DRAWING SUMMARY

The Drawings;

FIG. 1 depicts the difference between alpha-triadic and conventional representation.

FIG. 2 lays out the five degrees of articulation in the subject construct.

FIG. 3 describes these degrees and their relationship to one another.

FIG. 4 shows the reciprocal effects of complementary categories within the construct.

FIG. 5 indicates how a single cognitive unit can be embedded in a larger mosaic by a process of exterior alpha-triangularization.

FIG. 6 shows a sample alpha-triadic unit, with all degrees of articulation filled in.

FIGS. 7 through 9 present three other such sample domains, demonstrating the applicability of the paradigm.

Figure 11:
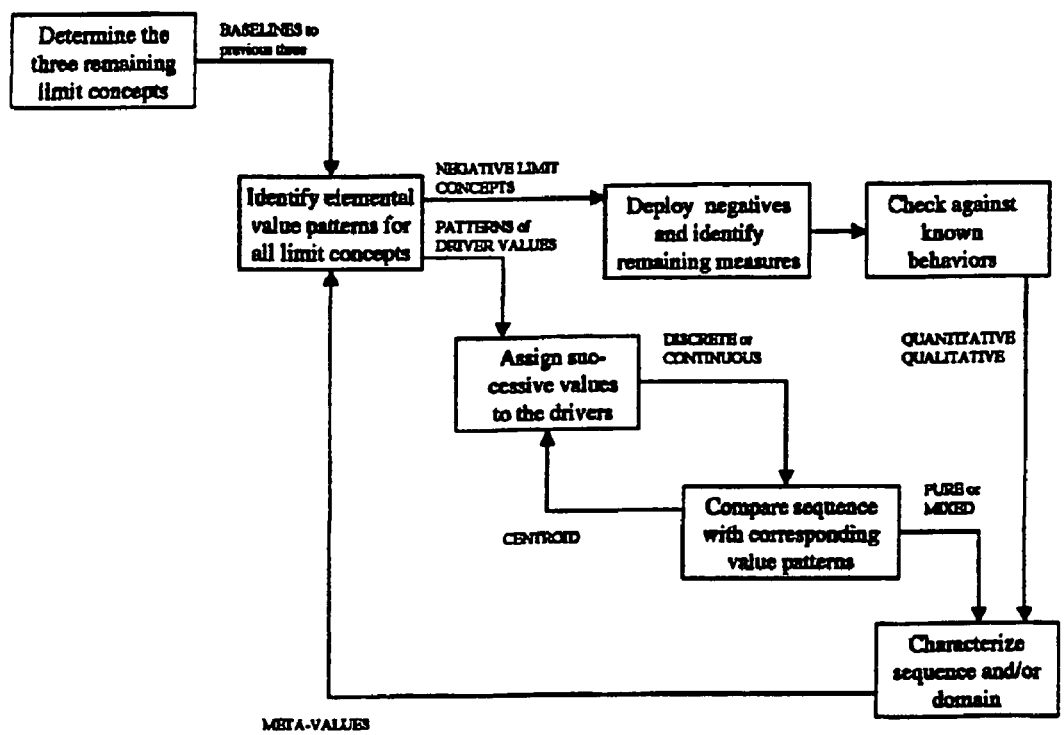
FIG. 11 shows the nominal sequence for exploring a resulting domain analytically.
Figure 12:
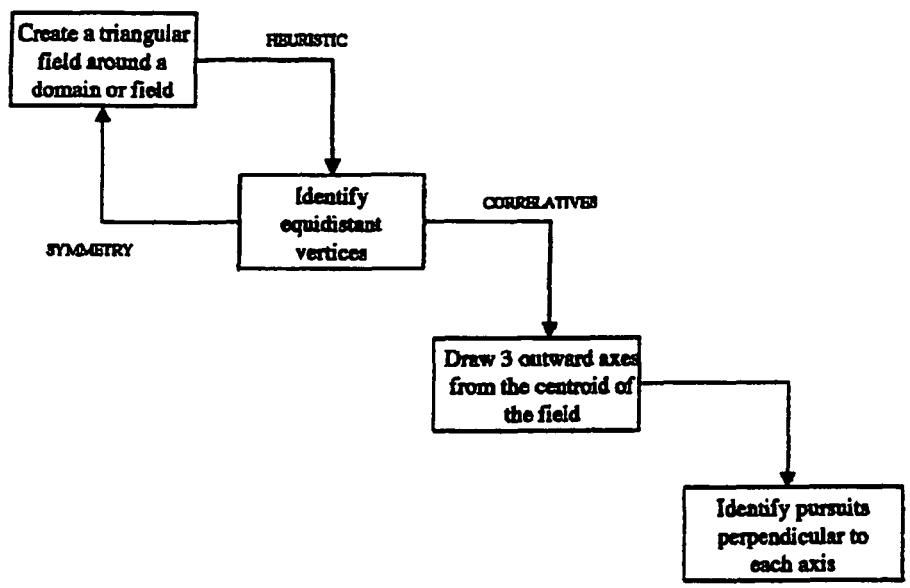
FIG. 12 shows the nominal sequence for obtaining an expanded field around a domain.

FIGS. 13 through 16 detail the exploration of a sample domain through one of the branches indicated in FIG. 11.

Figures 17, 17A, 17B:
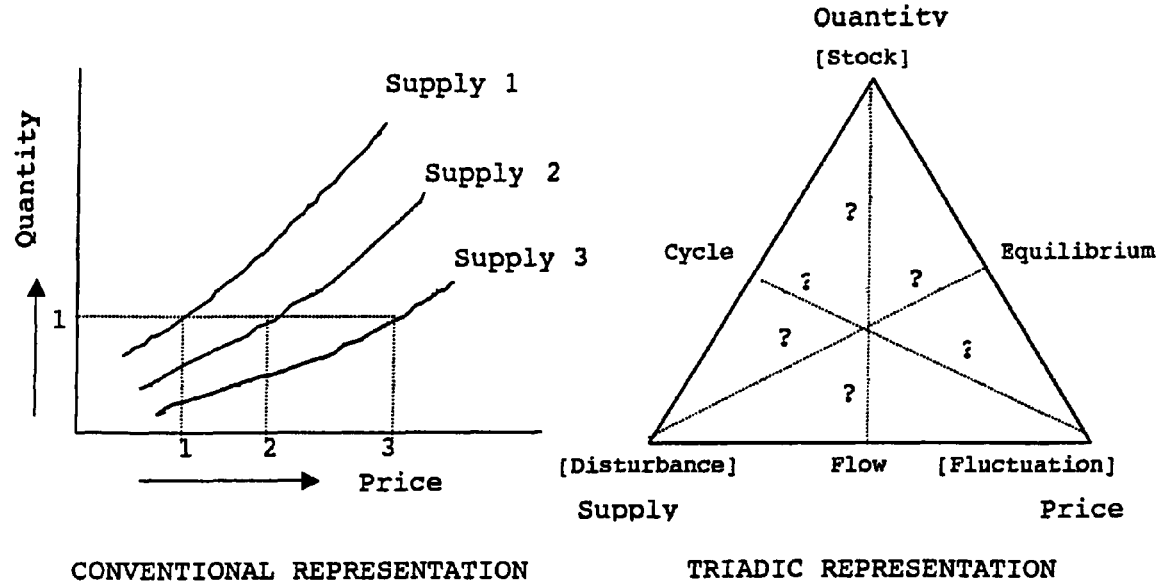
Figure 19:
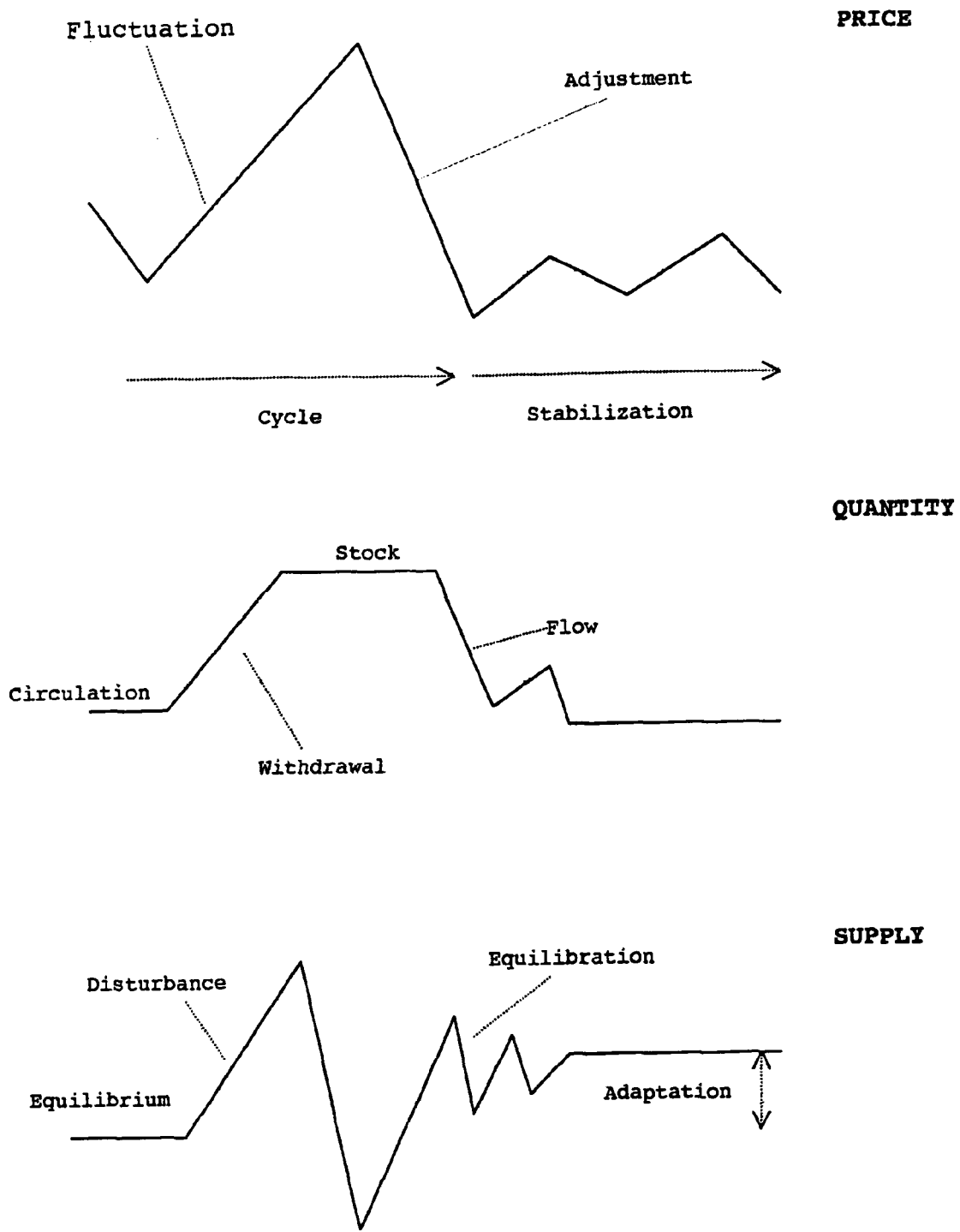

FIGS. 17 through 19 detail the exploration of a second domain through another branch indicated in FIG. 11.

Figure 20:
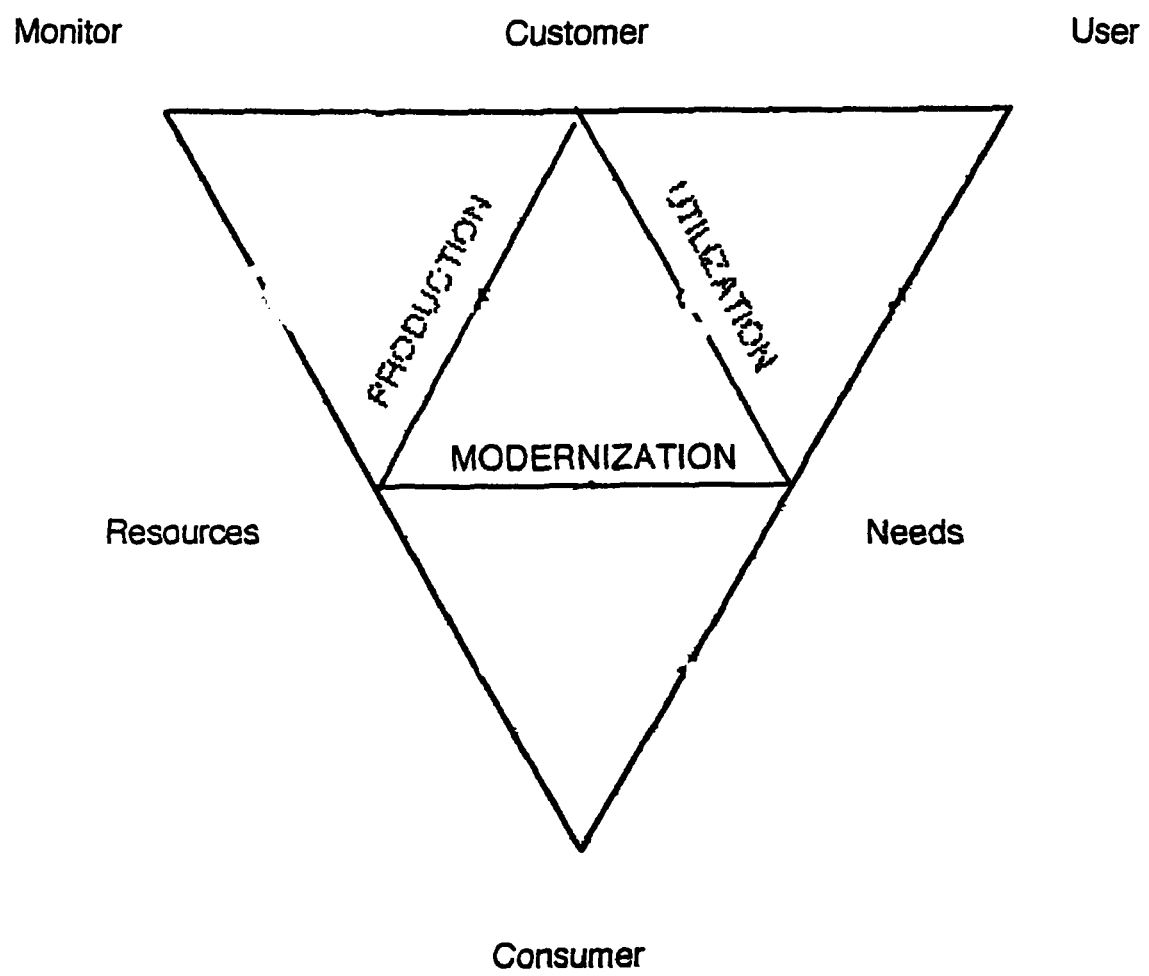
Figure 21:
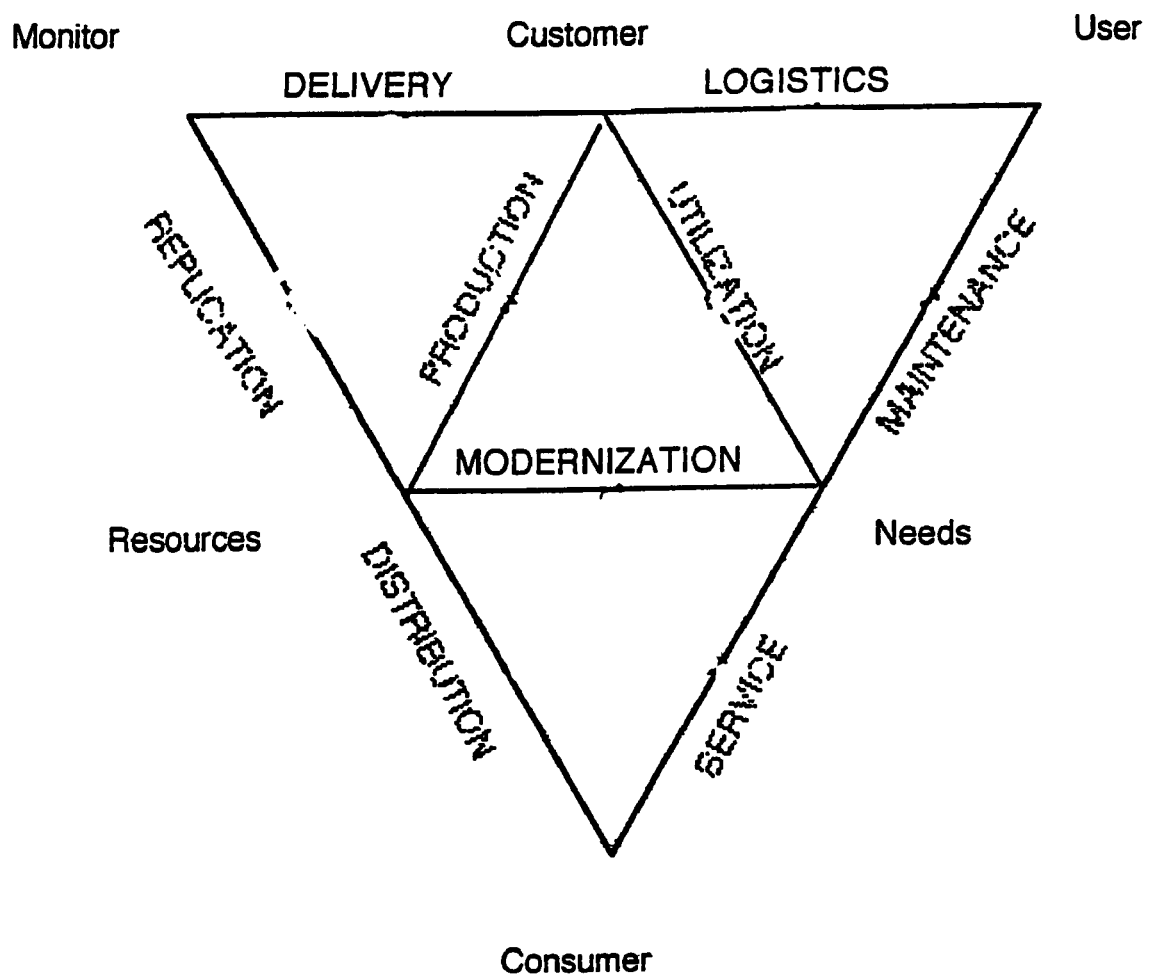
Figure 22:
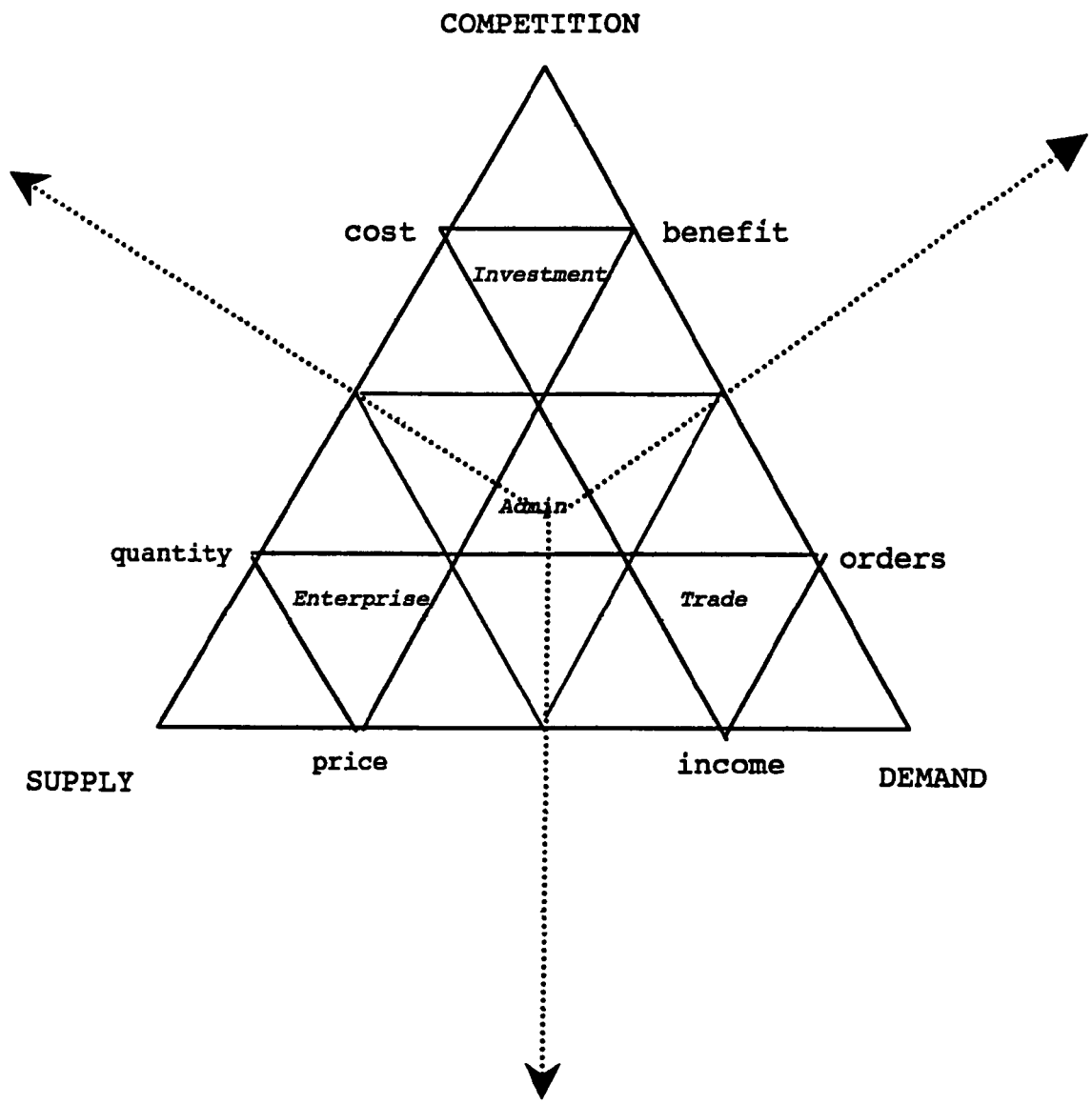

FIGS. 20 through 22 show the development of an expanded field around a central domain.

REFERENCE NUMERALS FOR THE DRAWINGS

The Reference numbers for the Drawings;
Labels for FIG. 2
    10, 12, and 14 primitives, drivers, etc.
    20, 22, and 24 polarities, pursuits, etc.
    30, 32, and 34 proper means or activities
    40, 42, and 44 characteristic means or activities
    50, 52, and 54 limit concepts
Labels for FIG. 3
    1X corners
    2X edges
    3X and 4X infrastructure
    5X midpoints
Labels for FIG. 4
    10$a$ stock
    30$a$ withdrawal
    40$a$ circulation
    50$a$ flow
Labels for FIG. 16
    101 working capital
    103 income taxes
    105 short-term credit
    107 long-term debt
    109 depreciation/amortization
    111 retained earnings

Preferred Embodiment

A preferred embodiment of the alpha-triadic context generator is illustrated in FIGS. 1 through 9.

Figure 1:
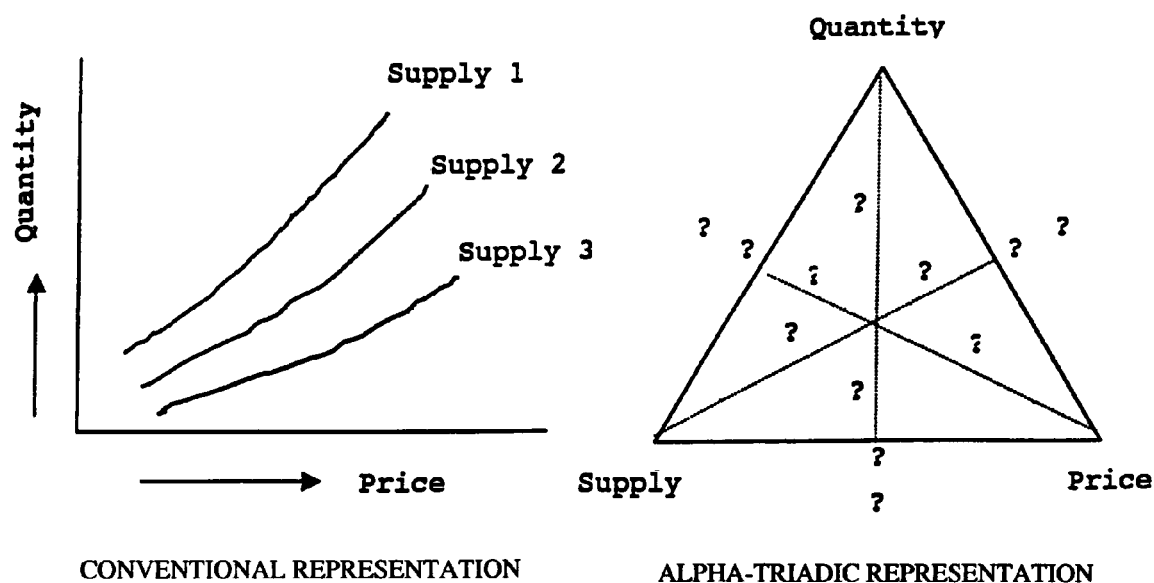

In FIG. 1 two ways of representing the realities of commodity supply are compared and contrasted. The conventional representation, using rectangular coordinates, is able to depict the interrelationship of three variables by means of a family of curves. Transitions from one curve to another entail changes from one supply schedule to another, with corresponding increments or decrements to quantity and price, as indicated on the other two axes. In the alpha-triadic approach, each of the three variables commands a vertex of an equilateral triangle relating the variables to one another. This triangle opens up a new set of quantitative and qualitative relationships, corresponding to the edges, infrastructure, and mid points of the respective edges. Identifying these new relationships gives to the entire problem complex a scope and structure that is not apparent using the conventional approach alone.

Figure 2:
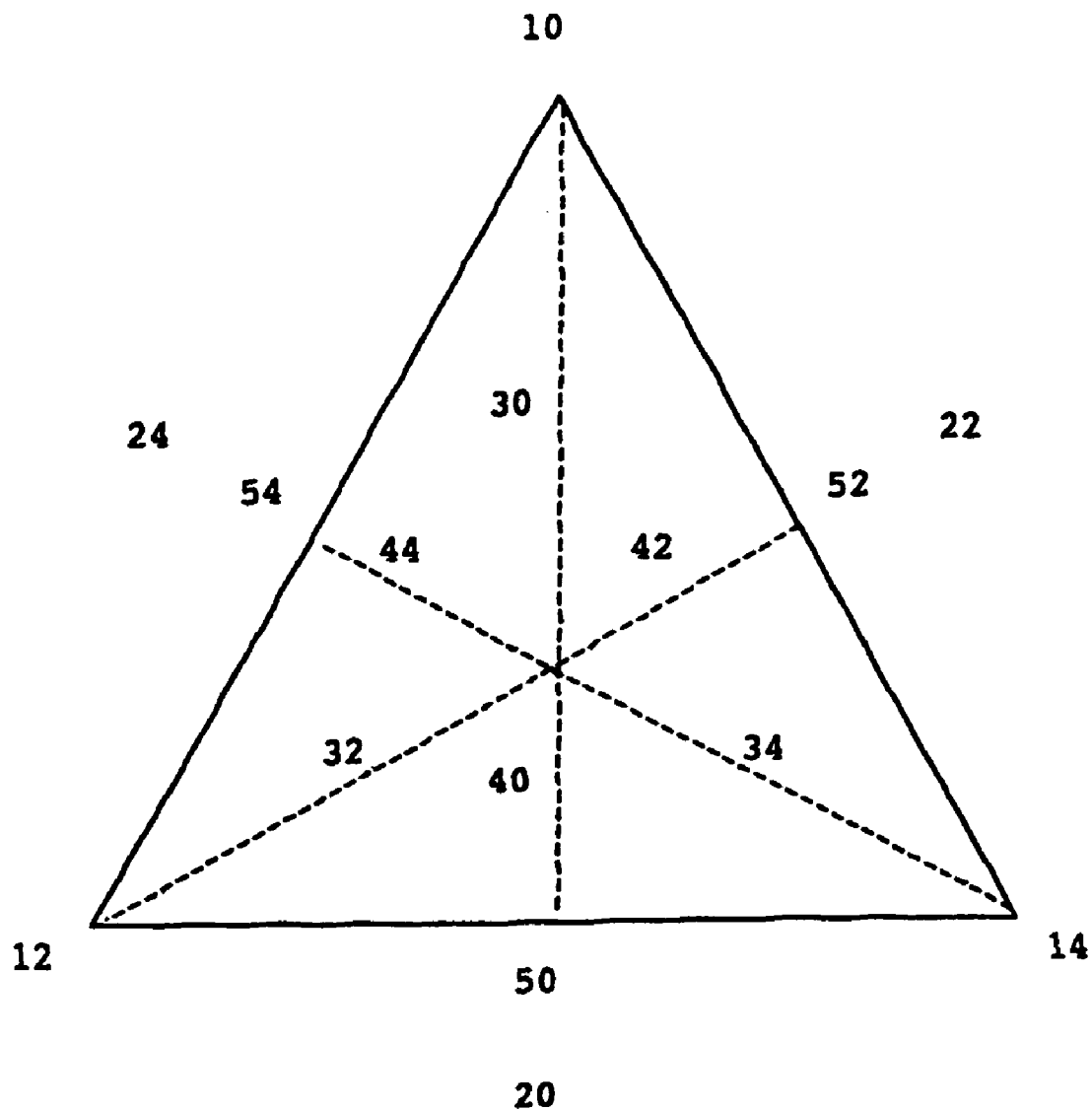

This structure is elaborated further in FIG. 2, where the various categories of alpha-triadic analysis are delineated. These categories include three 'primitives', 'drivers', 'points of reference', 'variables', goals', or 'objects' 10, 12, and 14, three derivative 'polarities', 'efforts', 'tensions', 'pursuits', or 'dialectics' 20, 22, and 24, an infrastructure of three proper 'means' or 'activities' 30, 32, and 34 and three characteristic means or activities 40, 42, and 44, and finally a set of three 'limit concepts' 50, 52, and 54. A triangular domain represents a self-contained area of cognitive concern. Each primitive, driver, point of reference, variable, goal, or object 10, 12, and 14 is 'unique' yet related to two others. Each primitive, driver, point of reference, variable, goal, or object 10, 12, and 14 has its own proper means or activity 30, 32, and 34 respectively. Each polarity, effort, tension, pursuit, or dialectic 20, 22, and 24 is determined by two primitives, drivers, points of reference, variables, goals, or objects 12 and 14, 14 and 10, and 10 and 12 respectively and governed by a third 10, 12, and 14 respectively. Each polarity, effort, tension, pursuit, or dialectic 20, 22, and 24 has two supporting means or activities to keep it in tension 32 and 34, 34 and 30, and 30 and 32 respectively. Each polarity, effort, tension, pursuit, or dialectic 20, 22, and 24 has one capacitating means or activity orthogonal to it 30, 32, and 34 respectively. Each polarity, effort, tension, pursuit, or dialectic 20, 22, and 24 has one characteristic means or activity orthogonal to it 40, 42, and 44 that forms a practical alternative to its capacitating means or activity 30, 32, and 34 respectively. No two polarities, efforts, tensions, pursuits, or dialectics are orthogonal; each has a qualitative and quantitative projection on the other. Each proper means or activity 30, 32, and 34 is capable of being measured by two polarities, efforts, tensions, pursuits, or dialectics 22 and 24, 24 and 20, and 20 and 22 respectively, but not by the third. 'Choice' or 'tradeoff' is always between means or activities and not directly between primitives, drivers, points of reference, variables, goals, and objects 10, 12, and 14 or polarities, efforts, tensions, pursuits, or dialectics 20, 22, and 24. Any and all five degrees of alpha-triadic articulation with any and all categories herein described are considered 'dimensions'. Any and all five degrees of articulation with any and all categories herein described are capable of 'measures' upon them.

Figure 3:
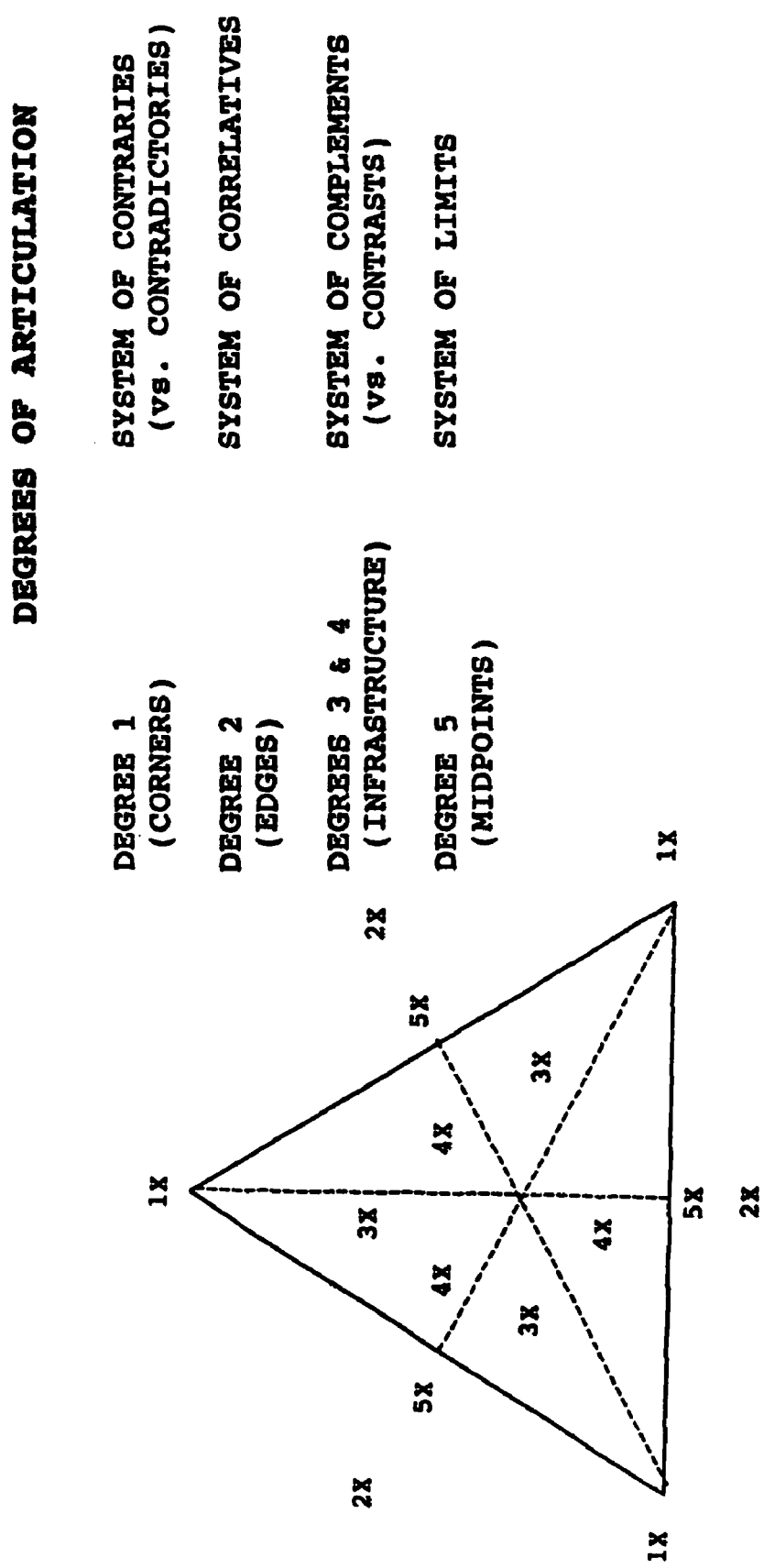

These degrees of articulation are related to one another in a general way as shown in FIG. 3. The first degree of articulation consists of corners 1X that form a system of contraries distinct from one another but related in such a way as to be exhaustive. By 'contrary' we do not mean 'contradictory', i.e., mutually exclusive, but rather admitting of admixture despite a relative opposition. The second degree of articulation is represented by the edges 2X formed by the relationships between corners. These form a system of correlatives in that they are mutually conditioning, as opposed to being linearly independent. The third and fourth degrees of articulation are formed by the domain infrastructure as a system of complements, that is to say, any two co-linear means from 3X and 4X complete each other in a reciprocal way, i.e., the more of one, the less of the other. By 'complement' we do not mean 'contrast', for contrasting entities do not have a natural, self-limiting relationship. The fifth degree of articulation consists of a system of correlative points formed by the three limit concepts 5X. These are limits to a trio of means 4X and at the same time a set of midpoints among contraries 1X.

Figure 4:
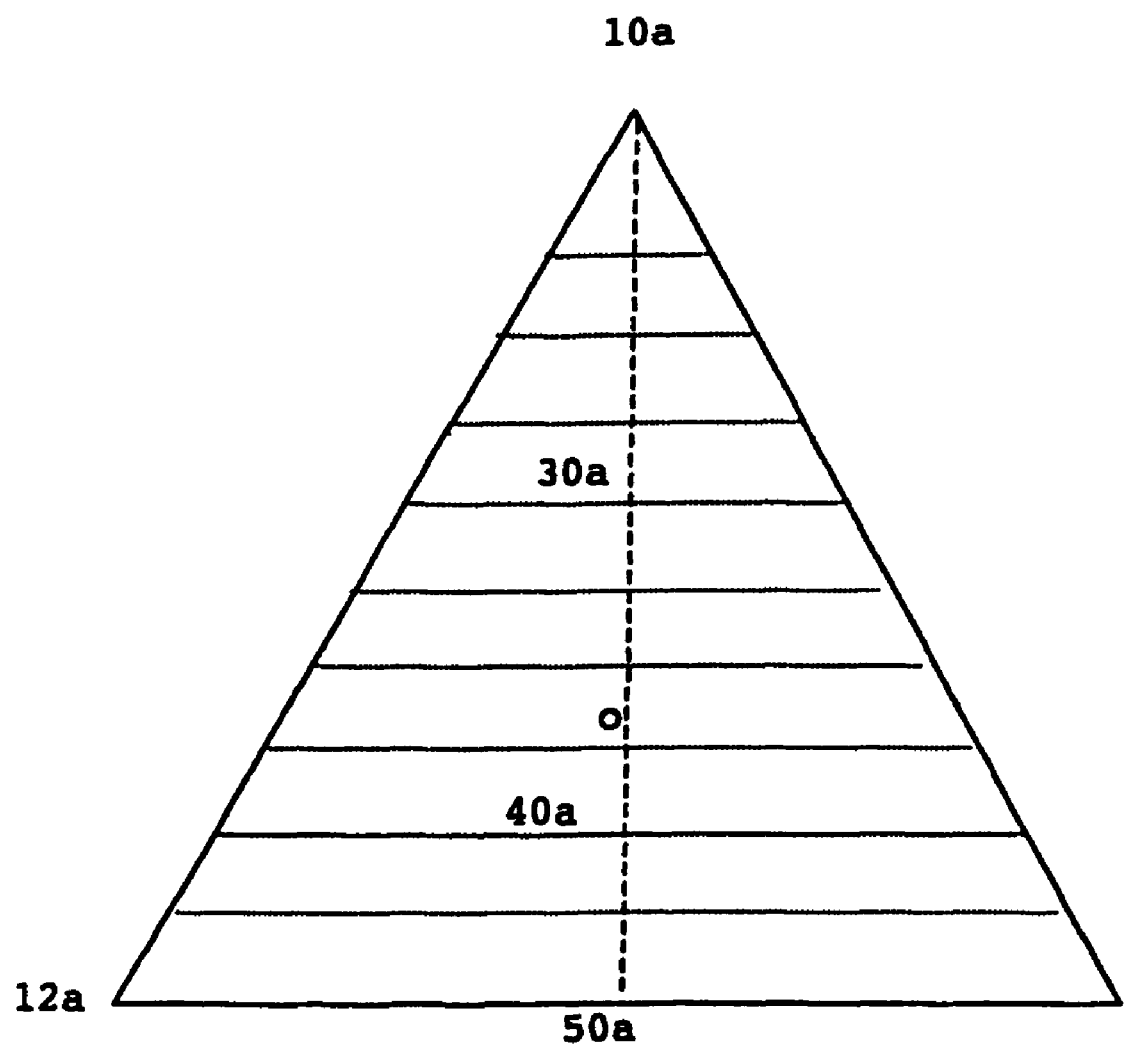

The conventions of complementarity are described in FIG. 4, where the quantitative and qualitative relationship between two opposing categories, a primitive and a limit concept, is explored. In particular, the effects of graduated change between such categories are typified in the reciprocal relationship between a 'stock' 10a and a 'flow' 50a, within the greater context of the commodity supply domain. Both categories are external to the domain proper, but as one increases and the other decreases, interplay takes place between the two, begetting a new contextual entity within the domain, sharing the traits of each in different proportions. The new entity at first remains a type of stock, i.e., a quantity of goods withdrawn from the general interchange, until at a point two-thirds of the way to the opposite edge, it suddenly becomes a flow, i.e., the quantity and velocity of goods in circulation. While an underlying continuum determines the precise nature of the resulting entity, a qualitative change takes place that lends its cast to a pair of complements, namely, the activities 'withdrawal' 30a and 'circulation' 40a. While a continuum also exists between two primitives, say 10a and 12a, a sudden qualitative change does not take place between them, because they are contraries and not complements.

Figure 5:
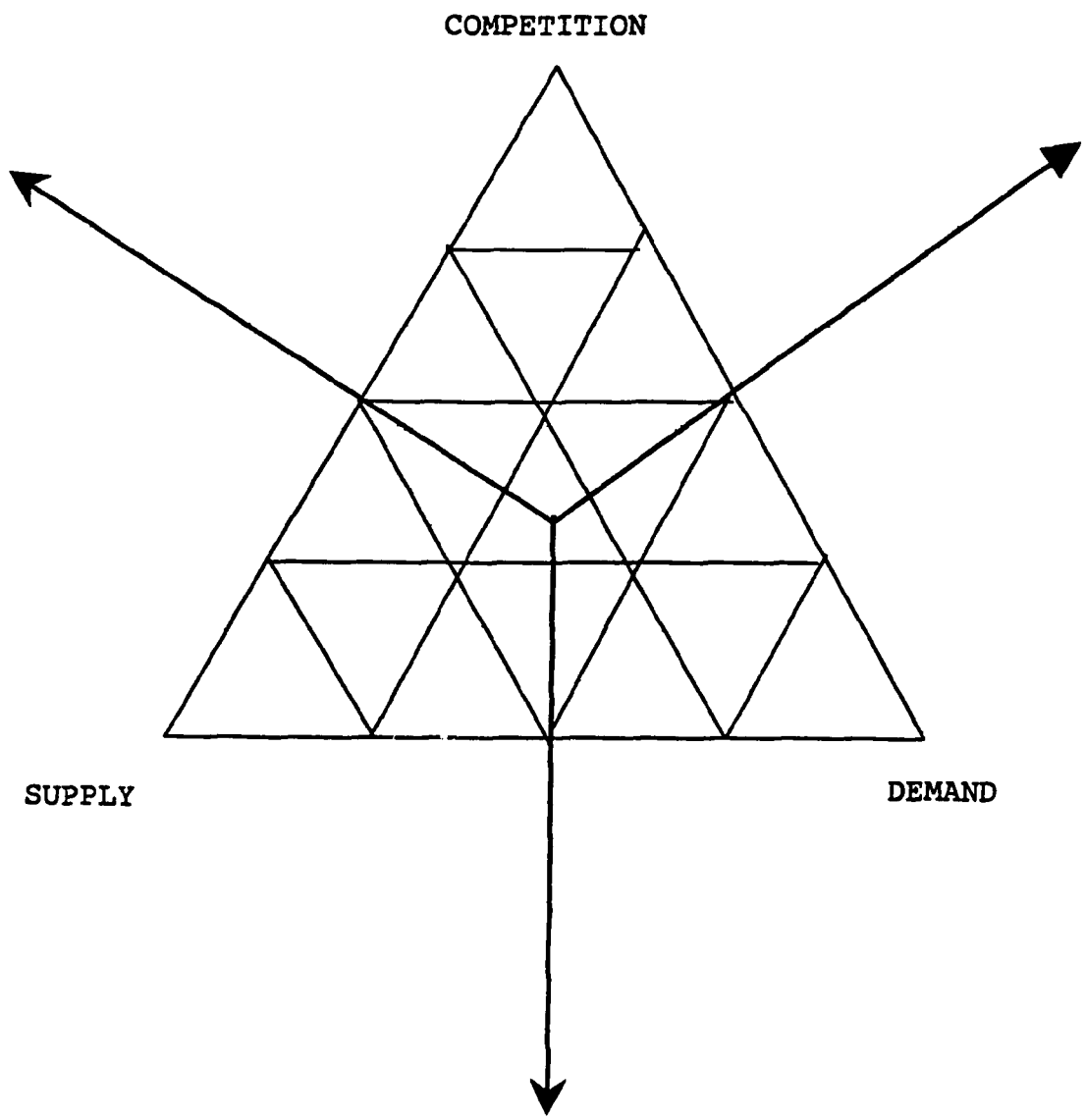

If we take a alpha-triadic domain with all its contraries, correlatives, and complements, we can extend it outwardly by a process of successive alpha-triangularization into a mosaic of related domains, as shown in FIG. 5. In this figure, various aspects of economic activity are represented in broad, symmetrical fashion, with 'supply', 'demand', and 'competition' at equal distances from the center of the network, which we can take to be 'the firm'. To be successful over time, the firm must continually ask itself: Will there be a demand for our product? Is there an assured source of supply to produce it? What is the competition and how can we overcome it? Economically, these concerns are 'equidistant', i.e., of equal import, to the firm, and the geometry is meant to reflect the economic realities portrayed. In principle, every vertex in the network will represent a different economic variable, and any three that are equidistant should also be correlative. The symmetry that prevails serves as a heuristic for exploring different aspects of economic reality. The directed line segments issuing from the center of the network represent the major 'axes' of economic activity. Any economic function perpendicular to a particular axis will share the same general character as all other economic functions perpendicular to that axis.

Figure 6:
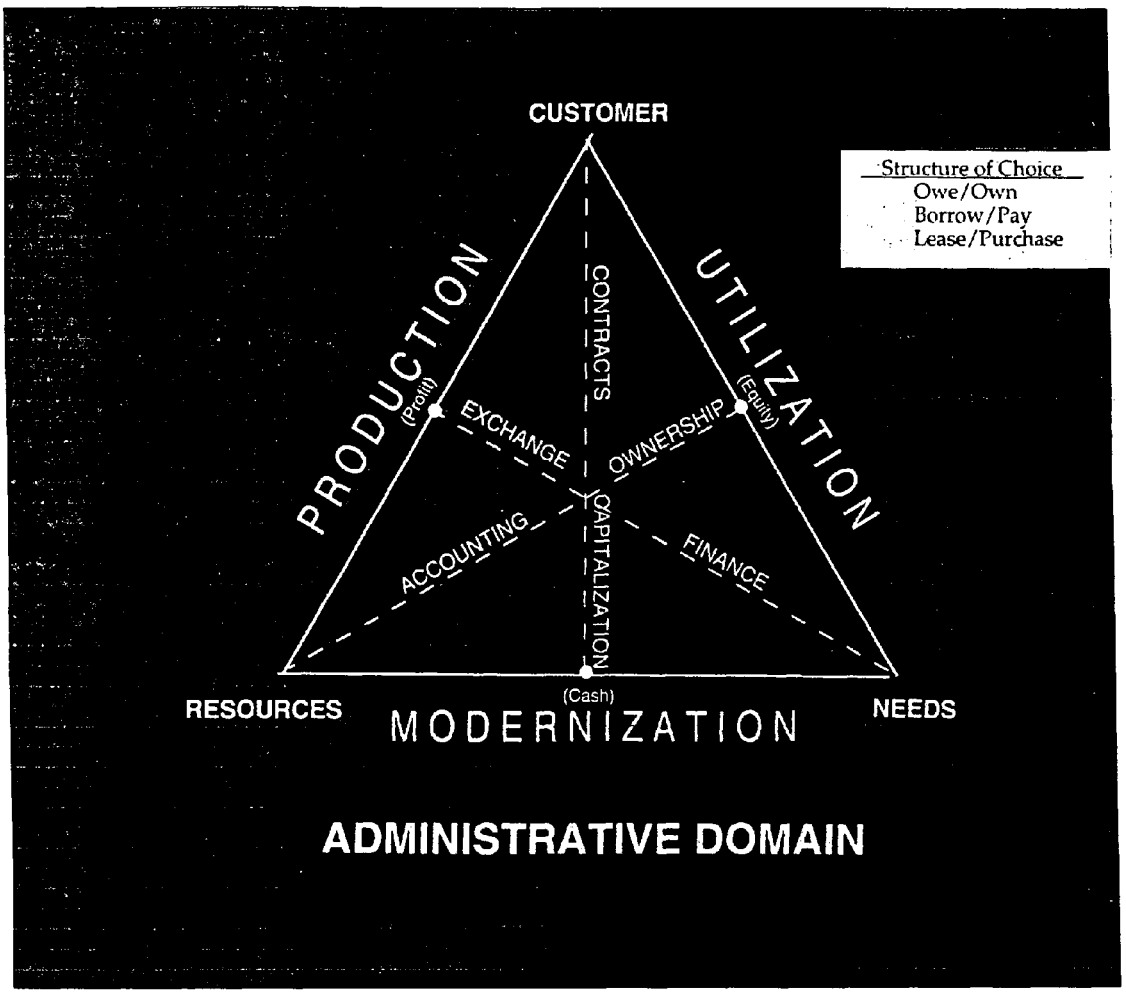

FIG. 6 shows a completed alpha-triadic unit in its fully articulated form. What it portrays in this case is the five degrees of 'administrative' or 'business management' dimensionality. Beginning with the drivers 'resources', 'needs', and 'customers', it deals with the correlatives 'production', 'utilization', and 'modernization'. Production is determined by resources and customers, and governed by needs. Similarly, utilization is determined by needs and customers, and governed by resources. Finally, modernization is determined by resources and needs, and governed by customers. These relationships are dialectical, i.e., the definition of each category is determined by that of the others around it. A set of proper means or activities supports these relationships, namely, 'accounting', 'finance', and 'contracts': accounting dealing with resources, finance with needs, and contracts with customers. 'Exchange' is complementary to finance and characteristic of production. 'Ownership' is complementary to accounting and characteristic of utilization. Finally, 'capitalization' is complementary to contracts and characteristic of modernization. A limit concept of exchange is 'profit', as is 'equity' of ownership, and 'cash' of capitalization. The infrastructure of administrative means or activities yields the three parts of a financial statement, namely, the operating statement (bottom line profit), the balance sheet (bottom line equity), and source and application of funds (bottom line cash). In addition, it suggests a structure of choice among complements, namely, 'borrow vs. pay', 'owe vs. own', and 'lease vs. purchase'. This is an epitome of the entire set of contextual relationships that make up the administrative domain.

Figure 7:
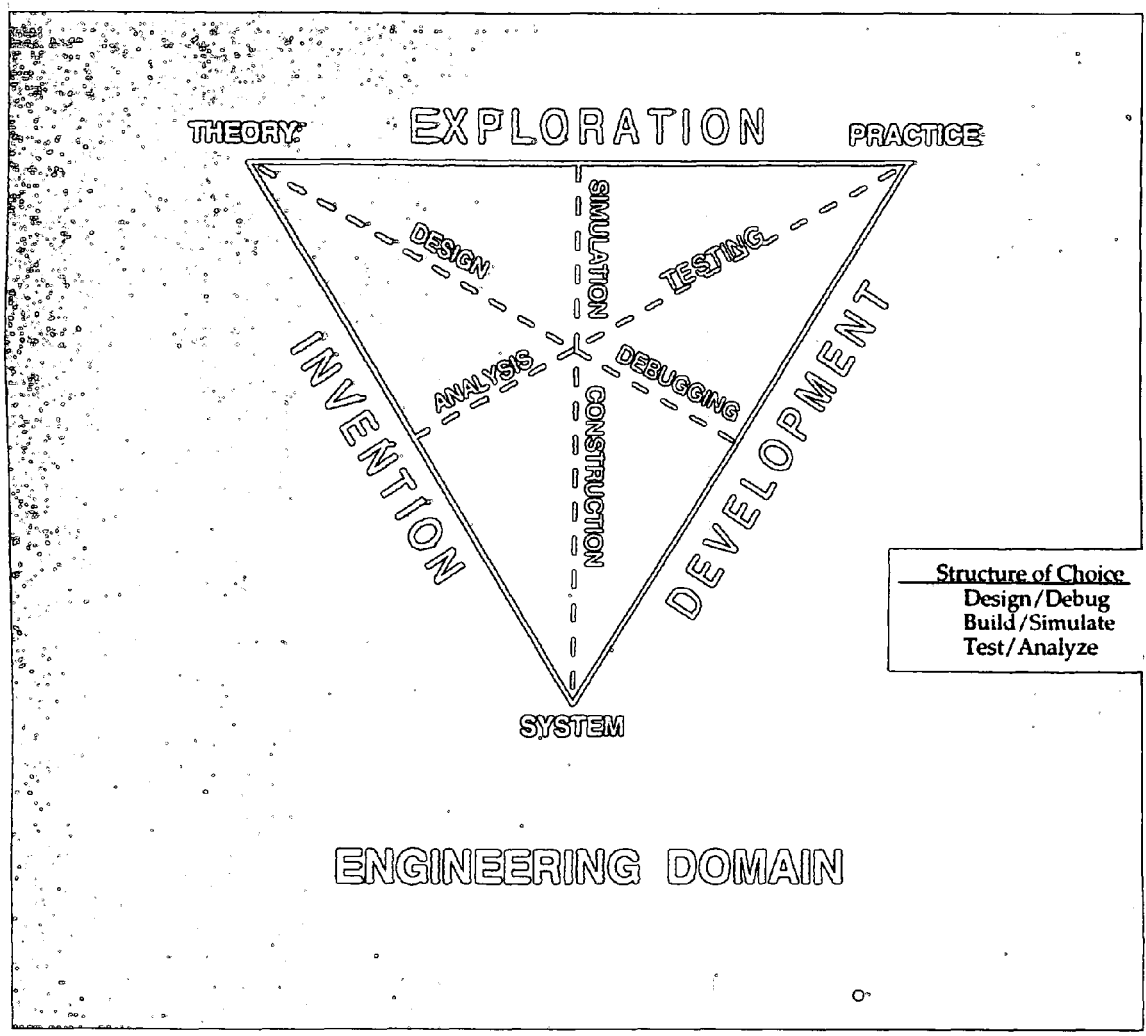
Figure 8:
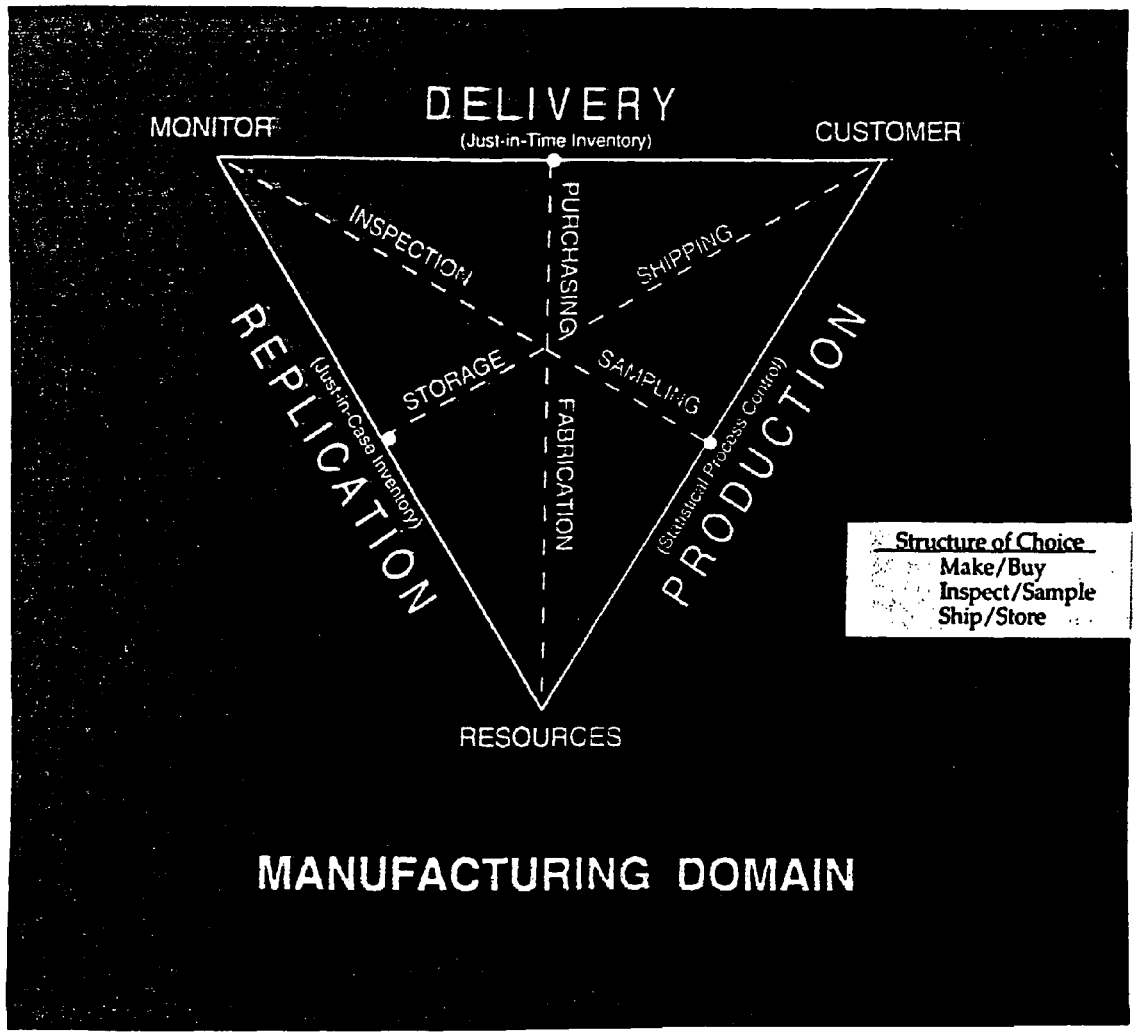
Figure 9:
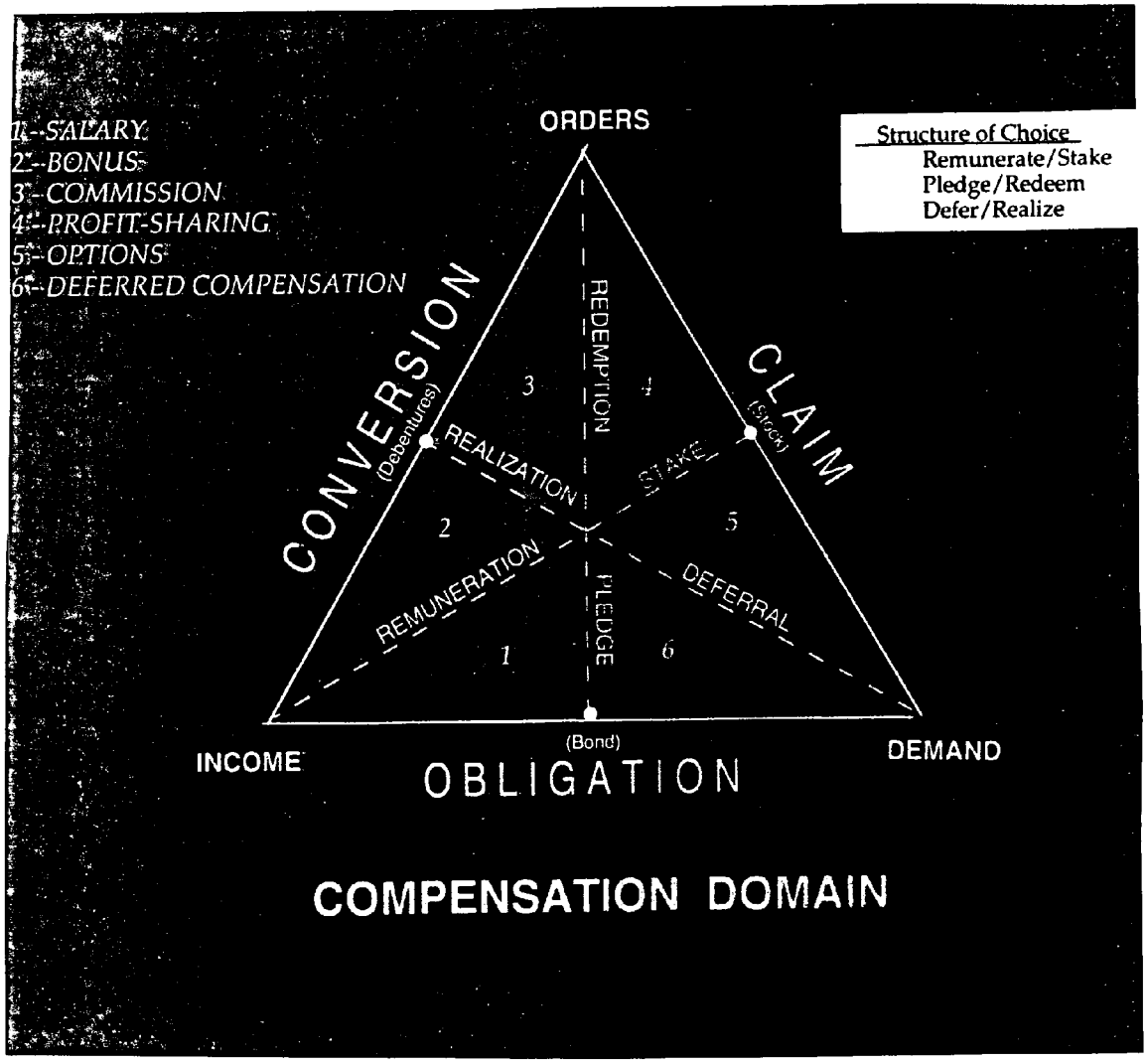

Three other sample domains are presented in FIGS. 7 through 9. Like the administrative domain, they depict self-contained cognitive units having a complete set of articulated dimensions. FIG. 7 portrays engineering, FIG. 8 manufacturing, and FIG. 9 compensation.

The engineering domain (FIG. 7) is determined by 'theory', 'practice', and 'system'/'product'. From these are derived the correlative set of pursuits 'exploration', 'invention', and 'development'. The basic structure of means includes 'design', 'construction', and 'testing'. Complementary to these are 'debugging', 'simulation', and 'analysis' respectively, with the limit concepts 'sketch', 'model', and 'prototype' (not shown). The basic structure of choice for engineering is 'design vs. debug', 'build vs. simulate', and 'test vs. analyze'.

The manufacturing domain (FIG. 8) is determined by 'resources', 'customer', and 'monitor'. From these comes the correlative set of pursuits 'replication', 'production,' and 'delivery'. The basic structure of means includes 'fabrication', 'inspection', and 'shipping'. Complementary to these three are 'purchasing', 'sampling', and 'storage' respectively, with the limit concepts 'just-in-case inventory', 'just-in-time inventory', and 'statistical process control'. The basic manufacturing structure of choice is 'make vs. buy', 'inspect vs. sample', and 'ship vs. store'.

The compensation domain (FIG. 9) is determined by 'orders', 'demand', and 'income'. From these come the correlative set of pursuits 'claim,' 'obligation', and 'conversion'. The basic structure of means includes 'remuneration', 'deferral', and 'redemption'. Complementary to these three are 'stake', 'realization', and 'pledge' respectively, with the limit concepts 'stock', 'bond', and 'debentures'. Located within the alpha-triadic space are the instruments 'salary', 'bonus', 'commission', 'profit sharing', 'options', and 'deferred compensation'. The basic compensation structure of choice is 'remuneration vs. stake', 'pledge' vs. 'redemption', and 'defer' vs. 'realize'.

General Process

In practicing the process of the invention, whatever the preferred embodiment, there are several important steps to be taken.

Figure 10:
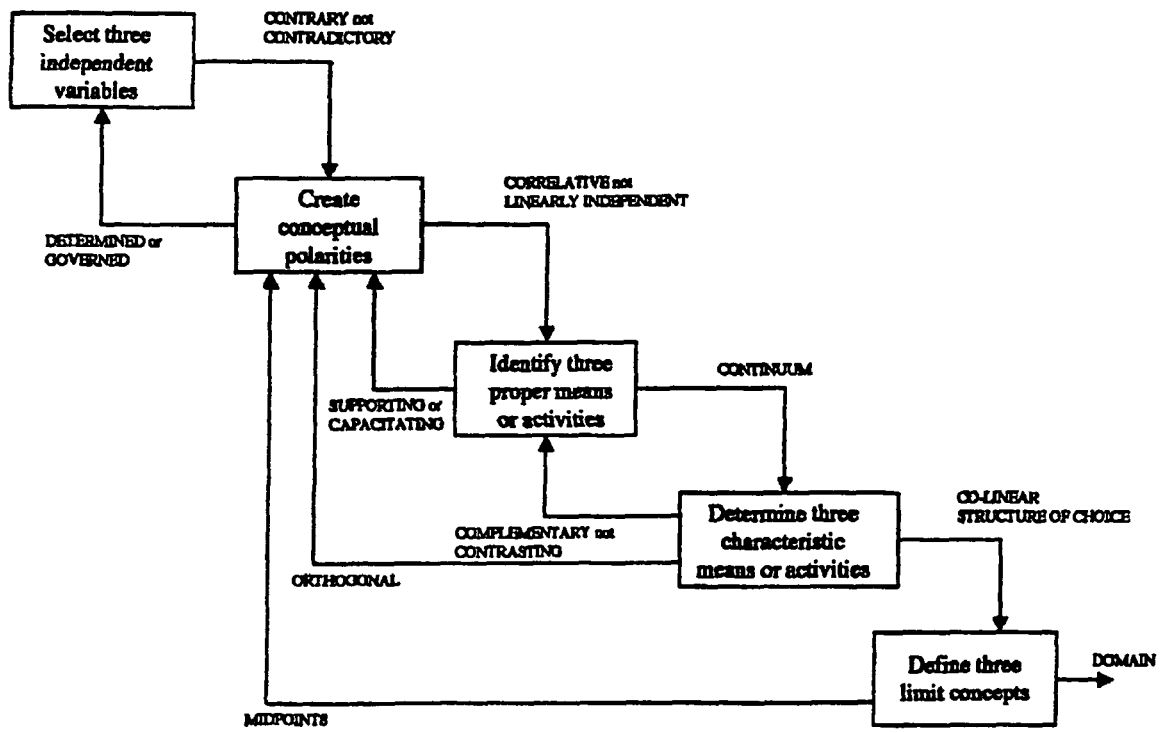
FIG. 10 shows the nominal sequence for applying the paradigm in the general case.

First, as shown in FIG. 10, the five-degree alpha-triadic paradigm must be applied to the subject matter by way of visualization.

Applying the paradigm can be an iterative undertaking, but the nominal sequence shown in the FIG. 10 begins with selecting three independent variables that act as contextual drivers. These drivers must be determined to be mutually contrary, admitting of degrees of presence, but not mutually contradictory, canceling each other out.

The next step is to identify the three polarities determined by the three pairs of drivers and to test each of the polarities against the opposite ('governing') driver. The polarities must form a correlative set, with no linear independence or orthogonality among them.

After this comes the identification of three proper means or activities, each tied to one of the drivers and forming half of a support pair for one of the polarities. Each of these means or activities serves as the capacitating means or activity to the polarity perpendicular to it.

On a continuum with each of these proper means or activities there must be determined another, complementary means or activity 'characteristic' of the polarity orthogonal to it. From the three pairs of complementary means, a set of three fundamental choices can be derived, together with three limit concepts, representing the ultimate extension of the infrastructure of means.

With this, the visualization of the fundamental domain is complete. To analyze the domain in greater detail as in FIG. 11, limit concepts will take on a greater role.

Although exploring a domain of cognitive subject matter is something of a free-form undertaking, we see in the nominal sequence of FIG. 11, two branches that can be taken. In either case, the sequence begins with the determination of the fourth, fifth, and sixth limit concepts, i.e., the remote opposites of the three initially derived in FIG. 10. The new limit concepts, super-positioned at the three corners of the triangle, form a set of baseline concepts for the existing three.

The next step is to identify elemental value patterns for all six limit concepts. Initially these can be either negative limit concepts or patterns of driver values. By 'negative limit concepts' we mean the negative of each of the six positive limit concepts, e.g., profit/loss, assets/liabilities, etc. Three of these negatives are then deployed as measures along an appropriate leg of the infrastructure, and the remaining collinear dimensions identified with corresponding qualitative or quantitative measures. It then remains to compare the analytical structure with known behaviors of the subject domain and any laws or phenomena derivable from the alpha-triadic paradigm. In this manner, the domain receives its first, unforeseeable characterization.

A second characterization of the domain takes its cue from patterns of driver values. The driver is antecedent to the baseline limit concept and can take on sequences or series of magnitudes, whose qualitative characteristics share the nature of the limit concepts originating at the driver or terminating at the opposite mid-point. These qualitative characteristics have their point of balance at the centroid of the alpha-triadic structure. At the extremes, however, they can reveal six different elemental patterns that can be used to characterize a given phenomenon.

The third phase of the general process (FIG. 12) deals with synthesis, the creation of an external context for a given domain, employing symmetry as a form of heuristics. This sub-process involves identifying the nature of equidistant vertices and applying the basic alpha-triadic structure. These external vertices form correlative categories and the links then form sets of correlative pursuits perpendicular to three axes radiating from the centroid of the subject domain.

All three phases of the general process can be activated at the same time, so that visualization, analysis, and synthesis take place in a single movement.

Sample Process

To show how the general process is exemplified in a particular instance, it is enough to consider the development of the business administration domain already presented in FIG. 6.

At the risk of repetition, we apply the alpha-triadic paradigm to the subject matter by creating a visual image.

First, consider the drivers of business administration: Resources, Needs, and Customers. For the purposes of this application, treat these as independent variables. Although we choose to relate them to each other, thus forming a set, they are internally opposed (i.e., 'contrary') within the context of administrative concerns. Nevertheless, they are not mutually exclusive ('contradictory'), for they can be admixed (e.g., 'customer needs').

We can then create from the polarities among these driver/variables three contextual correlatives: Production, Utilization, and Modernization. Each is 'determined' by two driver/variables and 'governed' by the third. From the standpoint of pursuits and purposes, these three can be said to bound the domain. In contrast to the three driver/variables, they are inherently 'correlative', not independent. They each have a projection on the other, qualitatively and (in principle) quantitatively, e.g., production entails utilization, and modernization supports both.

In identifying the 'proper' means or activity serving each of the three driver/variables, we need only consider the basic administrative functions of the firm, namely, Accounting, Finance, and Contracts. Following the alpha-triadic paradigm, these are readily seen to line up with the three driver/variables: resources, needs, and customers. We can verify that two of these activities support a polarity if they connect its two determining variables, e.g., accounting and contracts support production by internally linking resources and customers. Finance, the third activity, is said to "capacitate" production.

To extend each of these activities in collinear fashion to obtain 'characteristic' means or activities requires only that an underlying continuum be assumed to terminate at the mid-point of the opposing polarity. The three new means or activities must be seen to be characteristic in some way of the polarity they abut, e.g., Exchange of production, as opposed to Finance. These characteristic means or activities must truly be 'complementary' to their counterpart activities, as yellow is to blue, so to speak, not 'contrasting', as yellow is to red. They must null out at a transition point as white light supervenes momentarily when one activity becomes predominant in proportion as the other recedes. Both collinear activities are orthogonal to one polarity, but one is characteristic, the other capacitating. The three pairs of activities must form a recognizable 'structure of choice' that characterizes the domain, in this case, Borrow vs. Pay, Own vs. Owe, and Lease vs. Purchase.

We complete the application of the paradigm by defining three limit concepts as concrete termini of the three characteristic means or activities, in this case, Profit, Equity, and Cash. In the nominal case, these limit concepts must be revealing, as must each of the newly disclosed dimensions of the alpha-triadic construct.

If any set of dimensions fails to illuminate, fails to harmonize among its members or with the other contextual elements, the paradigm has not been successfully applied and a new iteration must be undertaken in search of a recognizable fifth-degree alpha-triadic domain. If such a construct does materialize, it is truly a new achievement, concrete, useful, and reproducible, an organic self-contained building block that only now becomes available.

The next step (analysis) is to explore the features of the Business Administration domain in all its particularity.

Figure 13:
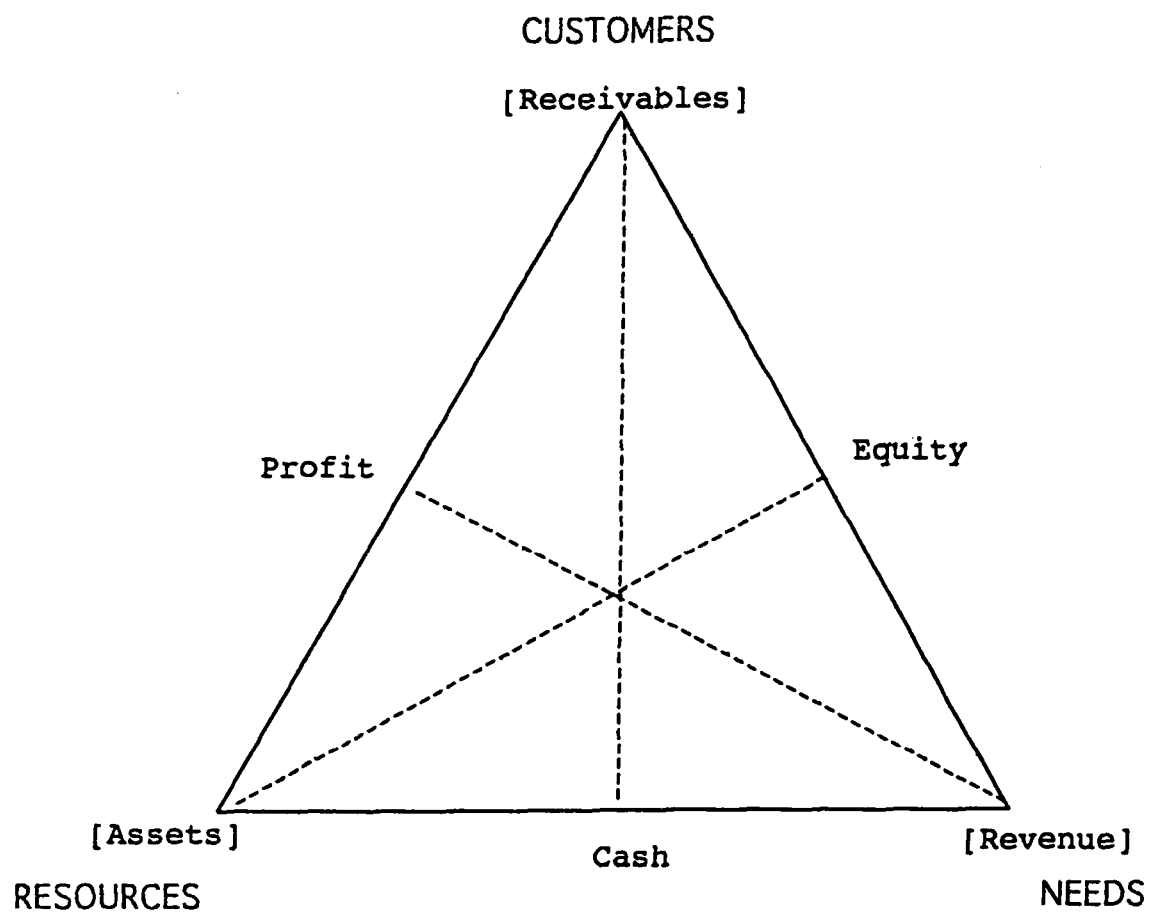

As shown in FIG. 13, exploration begins by identifying three new limit concepts, Revenue, Assets, and Receivables. These form a baseline to profit, equity, and cash respectively, i.e., they are the 'next best thing'. For each of the resulting six limit concepts, there are six negative ones: for profit, Loss; for assets, Liabilities; for cash, Deficit; for revenue, Expenses; for equity, Debt; and for receivables, Payables.

Figure 14:
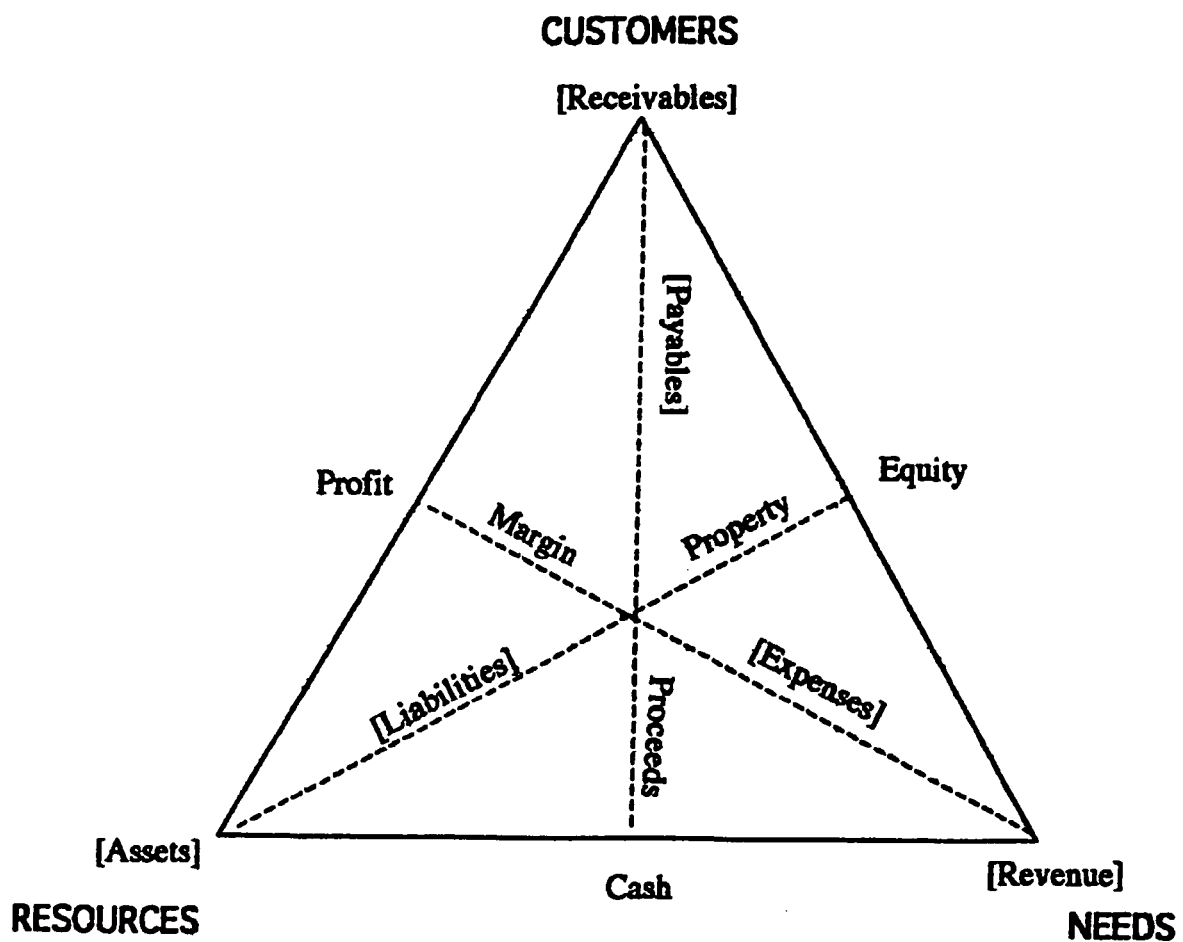

As indicated in FIG. 14, the three main negatives can be seen to lie along the three internal axes. They are complemented by three measures that correspond to the underlying means/activities of the basic administrative domain, e.g., Property to ownership, margin to exchange, and proceeds to capitalization Together they form a basis of a standard financial statement.

Figure 15:
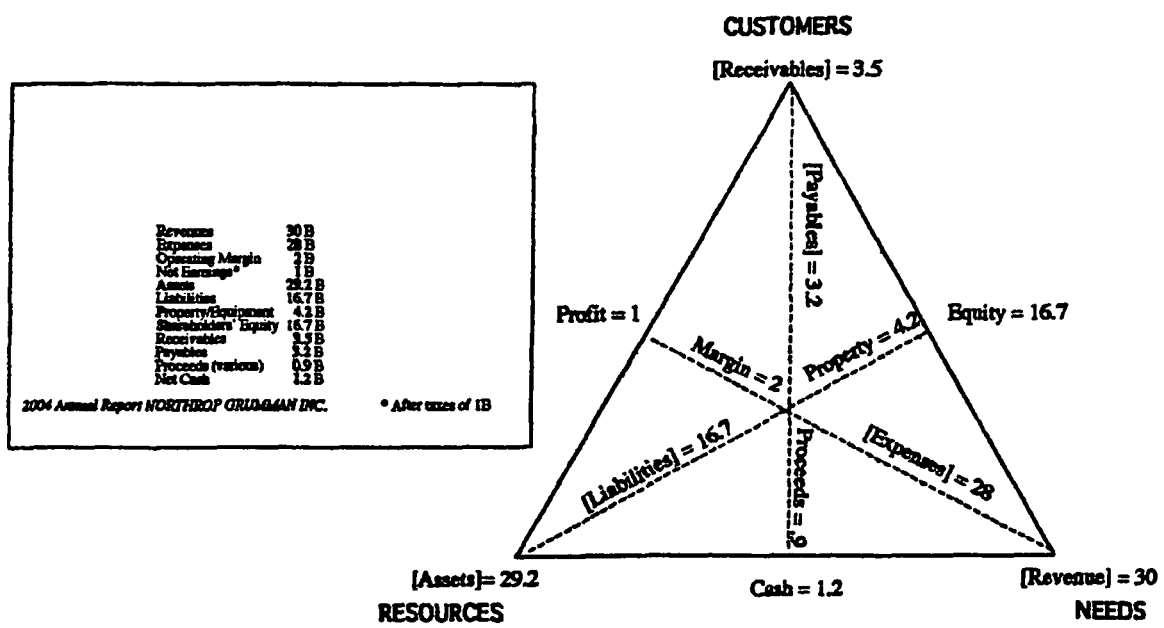

One test of the paradigm is quantitative. In FIG. 15, we take dollar figures from a recent annual report and see how they tally with the domain being explored. Here a standard operating statement can be represented to lie along the finance/exchange axis, i.e., Revenues of $30 billion minus Expenses of $28 billion gives an operating Margin of $2 billion. After taxes of $1 billion, a Profit of $1 billion results. Similarly, a balance sheet can be represented to lie along the accounting/equity axis, i.e., Assets of $29.2 billion minus Liabilities of $16.7 billion plus Property of $4.2 equals a net Equity of net Equity of $16.7 billion. Finally, the cash statement can be represented to lie along the contracts/capitalization axis, i.e., Receivables of $3.5 billion minus Payables of $3.2 billion plus Proceeds of $0.9 billion equals Cash of $1.2 billion.

Figure 16:
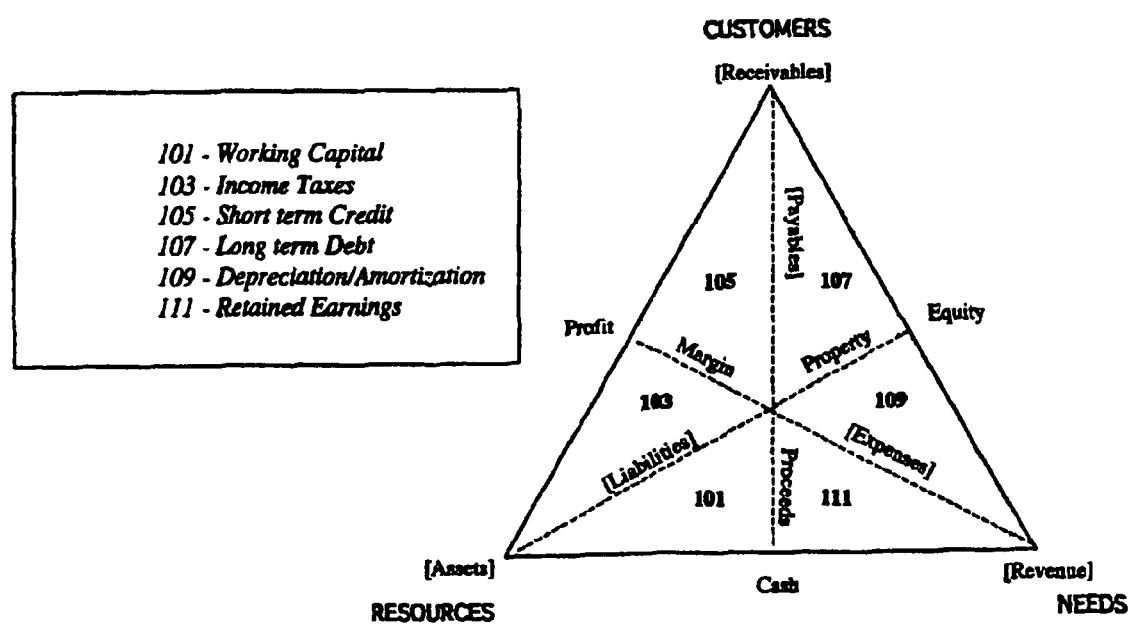

FIG. 16 provides another, qualitative test by carrying the typology further. It maps out areas of known business administration concern against the six partitions of the domain, as follows: 101 working Capital, 103 Income Taxes, 105 Short term Credit, 107 Long Term Debt, 109 Depreciation/Amortization, and 111 Retained Earnings.

Another analytic approach is to follow the alternate branch of domain exploration traced in the flow chart of FIG. 11. This approach is most effectively illustrated in FIGS. 17*a* and 17*b*, which depict the original commodity supply domain from FIG. 1. They show a sequence of driver/variable values derived from a family of curves in FIG. 1 7*a* and a full set of limit concepts indicated in FIG. 17*b*. These two figures provide a connection between the three 'known' variables (P,Q, S) and the elemental value patterns of the six limit concepts (stock, flow, disturbance, equilibrium, fluctuation, and cycle).

Let three successive values of the set of known variables be taken from FIG. 17*a* as follows: (p1,q1,s1), (p2,q1,s2), and (p3,q1,s3). The progression in the price variable is p1 p2 p3, which, as shown in FIG. 18, can be identified as 'fluctuation', as opposed to p1 p3 p2, which would be 'cycle'. The progression in 'quantity' is q1 q1 q1 which can be identified as 'stock', as opposed to q1 q2 q3, which would be 'flow'. The progression in the supply variable is s1 s2 s3, which can be identified as 'disturbance', as opposed to s1 s1 s1 which would be 'equilibrium'.

As in the exploration of the Business Administration domain, there are three baseline concepts, which provide the 'next best thing' to the original limit concepts (e.g., fluctuation vs. cycle). When allowing for mixed forms of behavior, the elemental value patterns can be identified within a given sequence or series, as in the case of business time series analysis, for which we present an example (FIG. 19) using pairs of collinear means/activities corresponding to each driver variable:

adjustment/stabilization, circulation/withdrawal, and adaptation/equilibration.

All of this analysis goes beyond the mere application of the paradigm and opens windows on old and new knowledge alike. As with the paradigm, this knowledge must harmonize internally and externally, or a new iteration must take place.

Finally, in addition to exploring a domain, an alpha-triadic context generator is useful for developing a set of surrounding domains by a process of alpha-triangularization. These adjoining domains form an external context for the central domain, as opposed to the intra-domain elements that make it up. If a 'domain' can be defined as an articulated alpha-triangular unit of intelligibility, then the external context can be considered a 'field', defined as a plurality of adjacent, coplanar domains.

FIGS. 20 through 22 show such a field built up symmetrically around the administrative domain of FIG. 6. With each instance of alpha-triangularization, this field begins to take on recognizable contours.

FIG. 20 shows the first instance of triangularization enclosing the first domain. Three new driver/variables 'govern' the domain externally in a way appropriate to the individual polarities of the core domain, while forming a closed set of contraries among themselves. The new drivers open up production to the realm of 'manufacturing' by adding the driver/variable 'monitor'; utilization to the realm of 'field operations' by adding the driver/variable 'user', and modernization to the realm of 'the front office' by adding the driver/variable 'consumer', a diffuse term to balance the specific category 'customer'.

FIG. 21 shows the completion of the three new, 'contextual' domains by additional polarities. Production is completed by and forms a correlative set with 'replication' and 'delivery', i.e., from the manufacturing standpoint production is vector-wise equal to replication plus delivery. These three pursuits bound the new domain, whose infrastructure was given in FIG. 8. Utilization is completed by and forms a correlative set with 'logistics' and 'maintenance', i.e., from the standpoint of field operations utilization is vector-wise equal to logistics plus maintenance. Finally, modernization is completed and forms a correlative set with 'distribution' and 'service', i.e., from the standpoint of the front office modernization is vector-wise equal to distribution and service. In this, the consumer must be customer, monitor, and user all in one.

In FIG. 22 the field is expanded further. Another three correlative drivers enclose the core domain and its adjuncts, revealing twelve new domains.

The outer variables that drive these new domains are 'supply', 'demand', and 'competition', as in FIG. 5. Together with the intermediate variable pairs 'quantity'/'price', 'order'/'income', and 'cost'/'benefit' they give rise to three additional core domains with their own adjuncts. The new core domains are correlative in their own right, representing 'enterprise', 'trade', and 'investment' respectively. Each of these has its local context, formed in the first instance (enterprise) by 'commodities', 'factor hire', and 'stores keeping'; in the second (trade) by 'provision', 'consumption', and 'compensation'; and in the third (investment) by 'economic behavior', 'expenditure'., and 'liquidation'.

With the sixteen domains thus formed (not all are labeled), the field of economics is aptly characterized and given an unprecedented overview, complete with symmetry and recognizable contours.

On the present scale, however, it is not possible to display each domain with its own infrastructure of six means/activities, a set of three limit concepts, and a three-part structure of choice. Rather, to complete the application of an alpha-triadic paradigm to the field of economics requires a certain degree of mechanization.

In short, to accommodate the desired level of detail while supporting a synoptic level of representation, it is expedient to invoke the resources of information technology as a necessary adjunct.

CONCLUSION, RAMIFICATIONS, AND SCOPE

Information technology is a timely adjunct to the highly differentiated system of analysis, synthesis, and visualization presented here. Without it, the capture and deployment of reliable context would all too soon encounter fatal limitations of scope and ease of use.

Nevertheless, the advantage cuts both ways. Without the availability of a realistic and workable context generator, which we have based on a five-degree alpha-triadic construct, the information overload that characterizes our times would overwhelm the shortcomings of a four-centuries old analytic device and an information technology that, while increasingly powerful, is all the more in need of intelligent governance.

While the examples we have introduced have come from the realm of economics and business, it is not to be understood that we have proposed merely a "business method". The device we have been at pains to outline can equally well be applied to other endeavors, such as the practice of medicine or the design of materials.

To date, however, the most egregious examples of contextual failure have occurred in the financial arena, where venerable institutions have been known to collapse, less because of malicious intent than because of a blind exploitation of available computing power by unmindful, but otherwise well-meaning employees.

While the detailed description contains much specificity, the latter should not be construed as limitations on the scope of the invention, but rather as an exemplification of one preferred embodiment thereof. Many other variations are possible. For example, different subject matter will provoke different contextual maps, topological distention of the basic geometry will provide additional avenues for quantitative manipulation, alternative configurations of domains and fields will account for various data models, each data model will in turn facilitate whole ranges of possible computer applications, and different approaches to constructing the data model will open interfaces to existing knowledge bases.

It is to be understood that the invention is not to be limited to the disclosed embodiments, but on the contrary, is intended to cover various modifications and equivalent arrangements included within the spirit and scope of the appended claims.

Accordingly, the scope of the invention should be determined not by the embodiments illustrated, but by the appended claims and their legal equivalents.

I claim:

1. A computer implemented process of identifying, analyzing, and solving a complex problem arising in a domain that involves a large number of practical or theoretical parameters, comprising the steps of:

first, creating a triangular frame of visual reference in the form of an equilateral triangle;

then selecting a first set of three of the parameters having a triadic relationship and being distinct from one another but related in such a way as to be exhaustive in defining the scope of the problem, and adding representations of them into that triangular frame of visual reference wherein each parameter of the first set is positioned to represent a separate corner of the triangle;

then selecting a second and different set of the parameters that form a system of correlatives that are mutually conditioned, as opposed to being linearly independent of each other, and adding representations of that second set of parameters into that same triangular frame of visual reference wherein each parameter of the second set occupies a position on a side of the triangle opposite to one of the parameters of the first set to which it is closely related;

thereafter continuing the same process in an iterative fashion with further and succeeding sets of three parameters constituting further degrees of articulation, wherein additional degrees of articulation are constructed upon the same triangle utilizing the different additional sets of three parameters, each of which fits within the framework of the previous ones; and when any set of dimensions fails to illuminate or to agree contextually to its members or with the other contextual elements, utilizing available computer power and information technology to undertake a new iteration in search of a recognizable fifth-degree alpha-triadic domain.

* * * * *